(No Model.) 11 Sheets—Sheet 1.

T. Z. COLE.
DREDGING MACHINE.

No. 415,619. Patented Nov. 19, 1889.

Fig. 9.
ON LINE 2 2

Witnesses
W. W. Mortimer
Stanly Elmore

Inventor
T. Z. Cole
By Phil T. Dodge
Attorney (No Model.) 11 Sheets—Sheet 3.

T. Z. COLE.
DREDGING MACHINE.

No. 415,619. Patented Nov. 19, 1889.

Fig. 4.
ON LINE 6-6

Witnesses
W. W. Mortimer
Stanly Elmore

Inventor
T. Z. Cole
By Phil. T. Dodge
Attorney (No Model.) 11 Sheets—Sheet 4.

T. Z. COLE.
DREDGING MACHINE.

No. 415,619. Patented Nov. 19, 1889.

Witnesses
W. W. Mortimer
Stanley Elmore

Inventor
T. Z. Cole
By Phil. T. Dodge
Attorney (No Model.)
11 Sheets—Sheet 5.

T. Z. COLE.
DREDGING MACHINE.

No. 415,619. Patented Nov. 19, 1889.

Witnesses
W. W. Mortimer
Stanly Elmore

Inventor
T. Z. Cole
By Phil. T. Dodge
Attorney

(No Model.) 11 Sheets—Sheet 7.

T. Z. COLE.
DREDGING MACHINE.

No. 415,619. Patented Nov. 19, 1889.

Witnesses
Inventor
T. Z. Cole
By Phil. T. Dodge
Attorney (No Model.)　　　　　　　　T. Z. COLE.　　　　11 Sheets—Sheet 9.
DREDGING MACHINE.

No. 415,619.　　　　　　　　　　　　　Patented Nov. 19, 1889.

Witnesses　　　　　　　　　　　　　　　　Inventor (No Model.) 11 Sheets—Sheet 10.

T. Z. COLE.
DREDGING MACHINE.

No. 415,619. Patented Nov. 19, 1889.

(No Model.) 11 Sheets—Sheet 11.

T. Z. COLE.
DREDGING MACHINE.

No. 415,619. Patented Nov. 19, 1889.

Fig. 33.

Fig. 34. ON LINE 5-5

Fig. 35.

Witnesses
W. W. Mortimer
Stanly Elmore

Inventor
T. Z. Cole
By Phil T. Dodge
Attorney

UNITED STATES PATENT OFFICE.

THOMAS Z. COLE, OF NEW ORLEANS, LOUISIANA, ASSIGNOR, BY MESNE ASSIGNMENTS, TO JAMES E. CAMPBELL AND DANIEL McCONVILLE.

DREDGING-MACHINE.

SPECIFICATION forming part of Letters Patent No. 415,619, dated November 19, 1889.

Application filed January 3, 1889. Serial No. 295,276. (No model.)

*To all whom it may concern:*

Be it known that I, THOMAS Z. COLE, of New Orleans, in the parish of Orleans and State of Louisiana, have invented certain Improvements in Dredging-Machines, of which the following is a specification.

The present invention relates to that class of dredging-machines in which a scow or hull is provided at one end with a swiveling frame or turn-table which supports an endless chain of dredging-buckets, by which material is elevated and delivered into a second chain of conveyer-buckets, also mounted on the scow.

The objects of the invention are to simplify the construction, overcome the various difficulties developed by a practical experience in machines of this class, and to adapt the machines for practical and speedy operation in places and under conditions for which ordinary machines are not adapted.

To this end the invention consists in constructing the scow or hull with an internal longitudinal channel to receive the chain of conveyer-buckets and in constructing this channel with a bottom opening to prevent the accumulation of obstructive material therein.

It also consists in providing the jointed frame which supports the chain of excavator-buckets with peculiarly-constructed joints at the junction of its two parts, whereby a smooth and continuous track is provided for the bucket-sustaining wheels.

The invention also consists in an improved manner of constructing the buckets and their connecting-links and in a novel manner of applying the supporting-wheels and of packing the several joints to prevent the access of foreign matters to the wearing-surfaces.

The invention also consists in improved means for horizontally swinging or vibrating the frame which sustains the chain of excavator-buckets.

The invention further consists in yielding wheels of peculiar construction for imparting motion to the excavator and the conveyer buckets.

The invention also consists in the employment of an endless driving-chain adapted to engage the conveyer-buckets for the purpose of imparting motion thereto.

In the accompanying drawings.

*Scow.*—In the drawings, A represents the scow or hull. With the exception of its bow and the longitudinal channel hereinafter described, this scow may be constructed in any ordinary form and manner, provided only that it is adapted to sustain the various operative parts. The bow presents, when viewed from above, a semicircular form, and its wall $a$, commencing near the water-line, inclines upward and inward, as shown. In other words, the bow presents the form of one side of a truncated cone. This construction, which is adopted in order to admit of the excavating apparatus being properly supported, is essentially the same as that represented in Letters Patent No. 186,113, granted to me on the 9th day of January, 1877, and is not separately claimed as part of the present invention.

Figure 2:
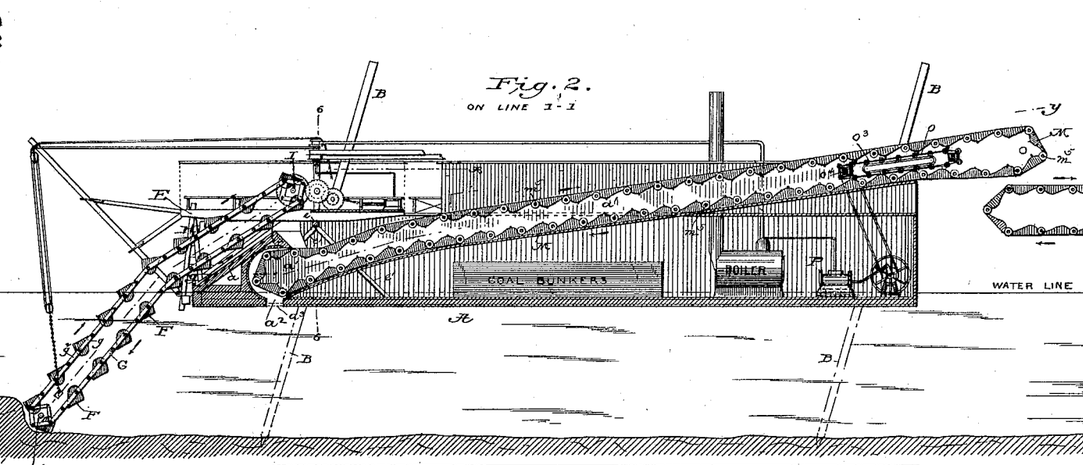
Fig. 2 is a longitudinal vertical section of the same on the line 1 1 of Fig. 3.
Figure 3:
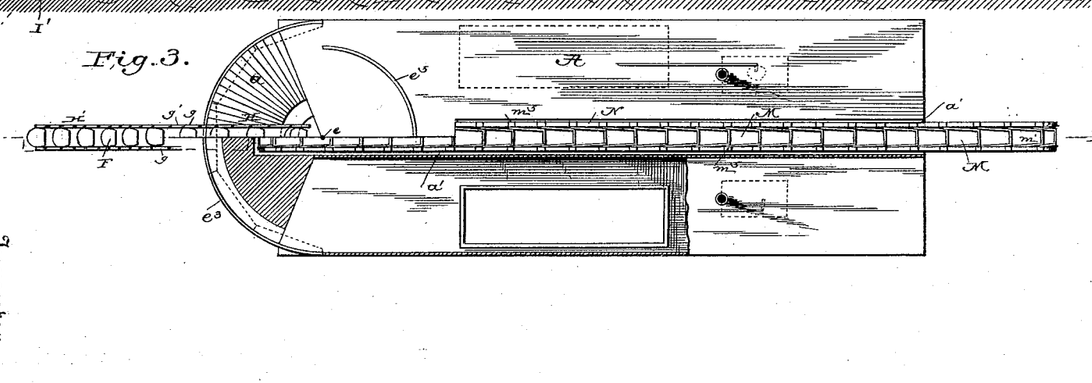
Fig. 3 is a top plan view showing the scow and the two series of buckets, the various portions of the framework being omitted to expose the other parts to view.
Figure 4:
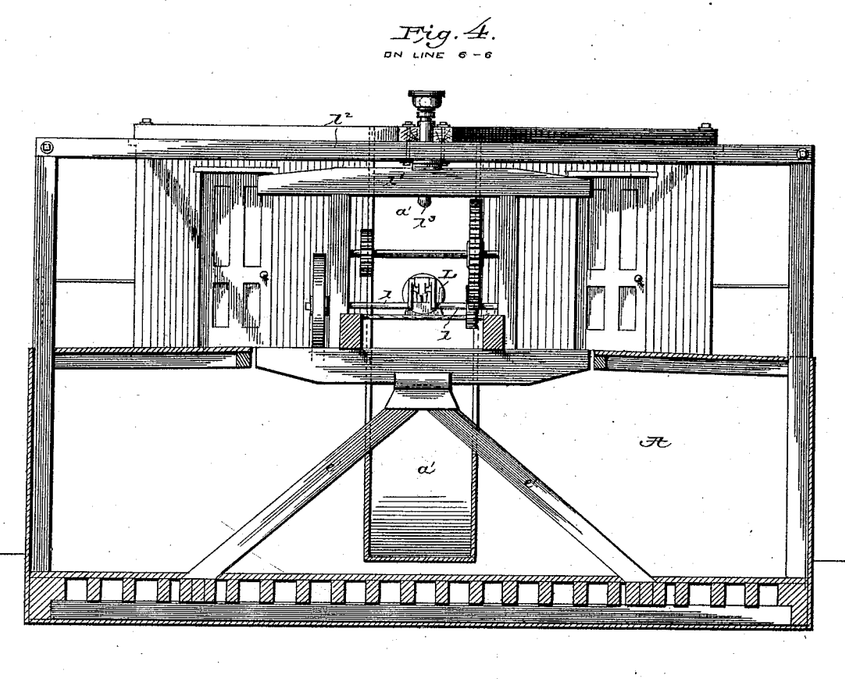
Fig. 4 is a vertical cross-section on the line 6 6, Fig. 2, with carrier removed.

In the center of the scow, commencing at a point near the bow and extending thence to the stern, I construct a channel $a'$, open at its top, but closed at its bottom and sides, as plainly represented in Figs. 2, 3, and 4. This channel is inclined longitudinally commencing at or near the bottom of the scow and extending thence upward and rearward, as shown in Fig. 2. At the forward end it is provided with an opening $a^2$ through the bottom of the scow in order to permit the escape of matters lodging therein. Owing to the presence of this opening the conveyer-buckets hereinafter described are washed and freed from adhering matters just before they reach the receiving-point and their inner surfaces left in a moist condition, so that the earth received from the excavator proper is prevented from adhering to them. A removable plate $a^3$—such as shown in dotted lines in Fig. 2—may be provided for the purpose of closing this opening, and thus increasing the buoyancy and seaworthiness of the scow when it is to be transported in open water.

It is to be observed that there is no direct communication between the channel and the interior of the scow, the channel being so closed that although the water may enter freely at its lower end it is prevented from passing thence into the buoyant portions of the scow.

In speaking of the channel hereinafter as a "closed channel" I have reference to the fact that it is closed at its sides and bottom from communication with the surrounding space in the interior of the hull. It is to be especially noted that my channel is built within and as a part of the scow or hull proper and that it extends downward within the scow to a point near the bottom and below the water-line. In this regard it is to be distinguished from those elevated chutes or super-structures which are erected wholly above the deck-line—that is to say, on top of the hull proper.

Figures 5, 6, 7, 8, 9:
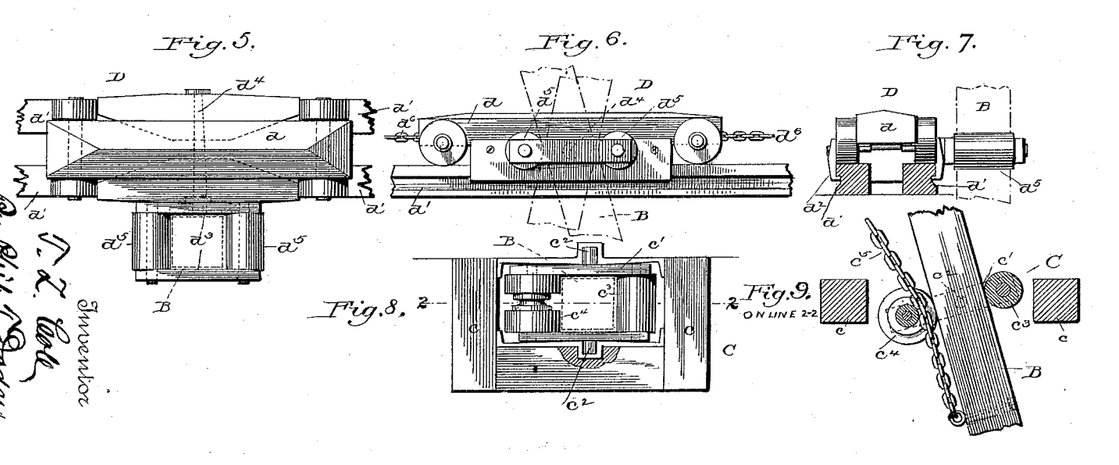
Figs. 5, 6, and 7 are respectively a top plan view, a side elevation, and an end view of one of the shifting trucks or guides by which the upper ends of the spuds are held.
Fig. 8 is a top plan view of one of the lower guides for a spud.
Fig. 9 is a vertical cross-section of the same on the line 2 2.

*Spuds.*—For the purpose of controlling the position of the scow and of moving the same forward as the excavator-buckets remove the soil I employ a suitable number of upright adjustable spuds B. Each of these spuds extends downward through a guide C, fixed to the scow near the water-line, and upward through a movable guide D to a higher level. Each of the lower guides C is constructed as shown in Figs. 8 and 9, and consists of a frame or support $c$, fixed rigidly to the side of the scow, and an internal rocking frame $c'$, which is sustained by horizontal trunnions $c^2$ and provided with horizontal rolls $c^3$ and $c^4$, designed to bear against opposite sides of the spud. The roll $c^4$ is grooved to permit the passage of a chain $c^5$, which is extended downward and attached to the lower end of the spud for the purpose of raising and lowering the same, the chain being attached at its upper end to a drum or other winding device. The rollers admit of the spud being easily raised and lowered; but, owing to the fact that their supporting-frame $c'$ is pivoted so that it may rock, the rollers are permitted to adjust themselves to the changing inclinations of the spud, so that there is no possibility of its binding or cramping between them. The essence of my invention in this regard lies in the mounting of the spud-guiding rolls in a rocking frame free to adjust itself to the changing inclination of the spud, and it is manifest that the details may be modified at will, provided this feature is retained.

As shown in Figs. 5, 6, and 7, the upper guides D consist each of a wheeled block or truck $d$, mounted on horizontal tracks or guides $d'$, held down in place thereon by side plates $d^2$, which engage under shoulders on the track, as shown in Fig. 7. A frame $d^3$ is supported in the truck by a horizontal journal $d^4$ and is provided with horizontal rolls $d^5$. The spud passes downward through the frame $d$ and between the rolls, as shown in the several figures. Chains $d^6$ are attached to opposite ends of the truck and extended thence to winding-drums or other operating devices, by which they may be caused to move the entire guide lengthwise of the scow.

As the lower end of the spud is seated on the bottom, it follows that the movement of the upper guide will change the inclination of the spud and thus move the scow forward or backward, as occasion may require.

While I prefer to pivot the roller-frame $d^3$, in order that the rollers may the more readily adjust themselves to the varying position of the spud, it is to be observed that this is not a necessary feature of my construction. The advantage of pivoting the roller-frames lies in the fact that it admits of the rolls fitting snugly against the spud at all times.

I do not claim the above-described spuds as part of the present invention, certain features of the same, together with additional features, being made the subject of a separate application, Serial No. 299,902, dated February 14, 1889.

Figure 10:
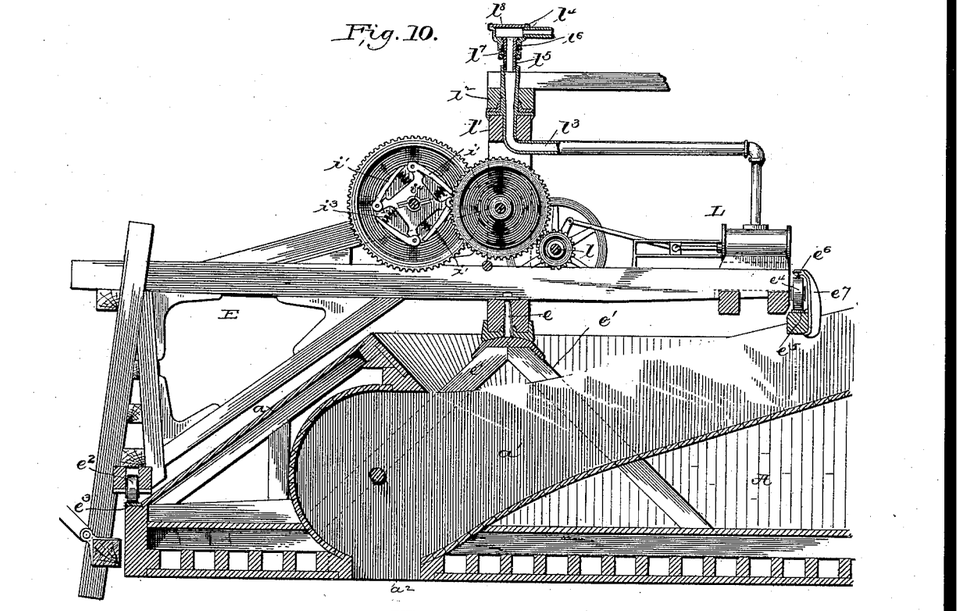
Fig. 10 is a vertical longitudinal central section through the forward end of the scow with the turn-table and driving-gear thereon, both series of buckets being omitted.

*Turn-table.*—Upon the forward end of the scow I mount the turn-table E, to sustain the excavating-buckets and their supporting-frame. This table turns, as shown in Fig. 10, upon a vertical axis $e$, mounted on the upper ends of converging posts $e'$, directly over the forward end of the longitudinal channel $a'$. At its forward end the turn-table is constructed with a downwardly-extending portion having at the foot a series of sustaining-wheels $e^2$, which bear on a circular track $e^3$ on the front of the scow. At its rear end the turn-table is provided with wheels $e^4$, which rest on top of a sustaining-track $e^5$ and beneath a stationary rail $e^6$. This upper rail is supported firmly in position by standards or brackets $e^7$, bolted at their lower ends to the scow. The overlying rail $e^6$ at the rear end of the turn-table is an important feature of the present invention. It serves to hold down the rear end of the turn-table and to prevent the same from lifting out of position in the event of the excavator buckets becoming overloaded or of their engaging an obstruction by which they are prevented from rising.

*Excavator frame and buckets.*—The excavator proper consists of a series of buckets F, provided with sustaining-wheels $f$, connected to an endless chain G, and arranged to travel in a supporting-frame H H', sustained by the turn-table. The upper end or section of the frame H is attached rigidly to the turn-table and extends downward and forward therefrom. The lower section H' is jointed to the upper section, as usual in this class of machines, in order that the lower extremity may be raised and lowered according to the depth at which the buckets are required to cut.

Figures 14, 15, 16, 17:
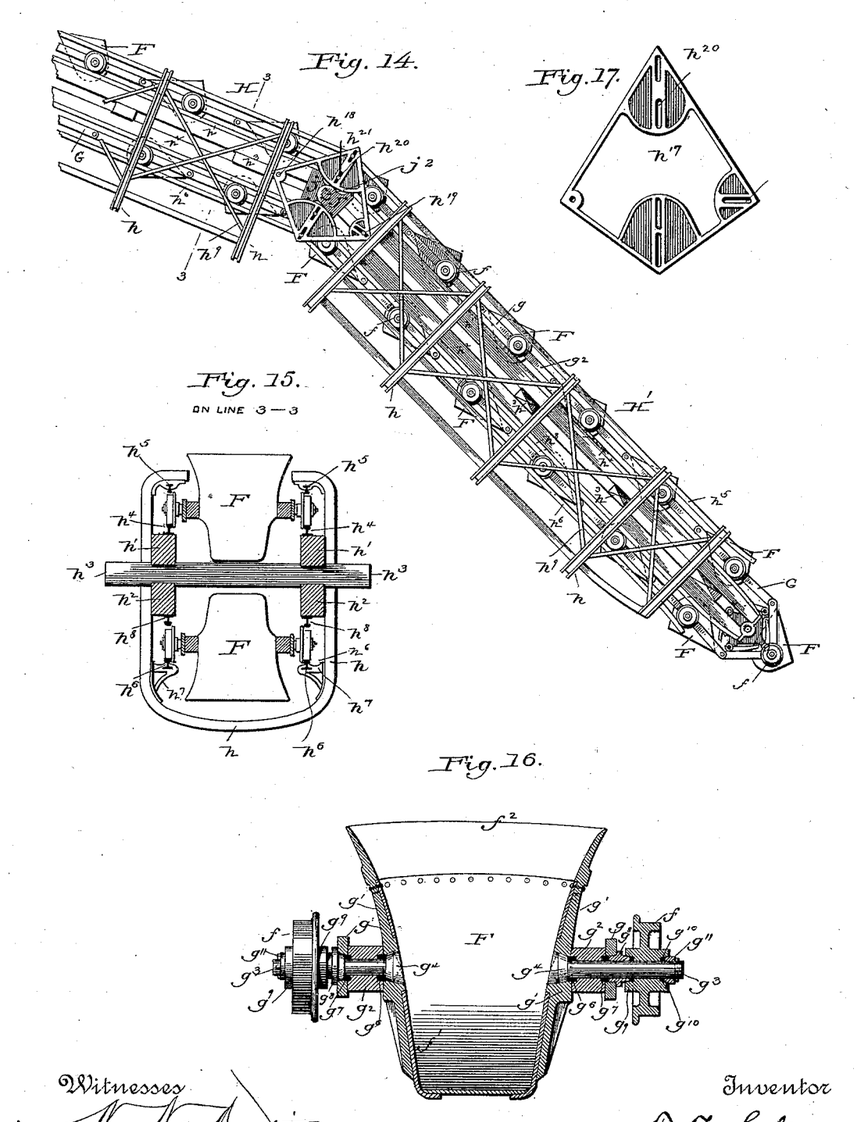
Fig. 14 is a side elevation showing the chain of the excavating or digging buckets and the frame in which they are supported.
Fig. 15 is a cross-section on the line 3 3 of the preceding figure.
Fig. 16 is a vertical cross-section through one of the buckets and its supporting-wheel.
Fig. 17 is a side view of one of the plates used at the joint of the frame which supports the excavator-buckets.

One feature of my present invention resides in the manner of constructing the frame shown in detail in Figs. 14 and 15. Each of the sections H and H' has as its basis a series of transverse metal bars $h$, bent into a U form, as shown in Fig. 15. Longitudinal timbers $h'$ and $h^2$, two on each side, are bolted firmly to the inside of the bars $h$ and connected by cross-timbers $h^3$. Rails $h^4$ are applied to the upper edges of the timbers $h'$ to sustain the wheels of the ascending loaded buckets, and overlying rails $h^5$ are fastened to the upper inwardly-turned ends of the bars $h$, to keep the wheels down in place on the rails $h^4$. Rails $h^6$, to sustain the wheels of the descending empty buckets, are sustained by brackets $h^7$, bolted to the inside of the bars $h$. Rails $h^8$ are fastened to the lower edges of the timbers $h^2$ to keep the wheels in place upon the underlying rails $h^6$. It will be observed that on the ascending portion the wheels travel between the rails $h^4$ and $h^5$, and that in the descending cars they travel between the rails $h^6$ and $h^8$.

In order to give additional rigidity to the frames, suitable braces $h^9$ may be applied, either diagonally, as shown in the drawings, or in any other suitable manner. At the upper end of their course the buckets and their sustaining-chains pass around and are driven by angular wheels I, the details of which will be hereinafter explained. At their lower ends they pass around guiding-wheels I' on a horizontal shaft on the lower end of frame H'.

The two frame-sections H and H' are jointed together by means of side plates J and J', bolted to the respective frames and connected by horizontal pivots $j^2$. The rails of the upper frame-section H form continuations of those on the lower section. In order that the wheels may pass freely to and fro, I employ between the rails of the two sections splicing rails or joints of peculiar construction adapted to permit the lower frame H' to swing upward and downward without interrupting the smoothness or continuity of the tracks. There are four of these joints on each side of the frame, one for each pair of rails. As they are constructed in duplicate, I have deemed it sufficient to illustrate a single joint.

Figures 22, 23:
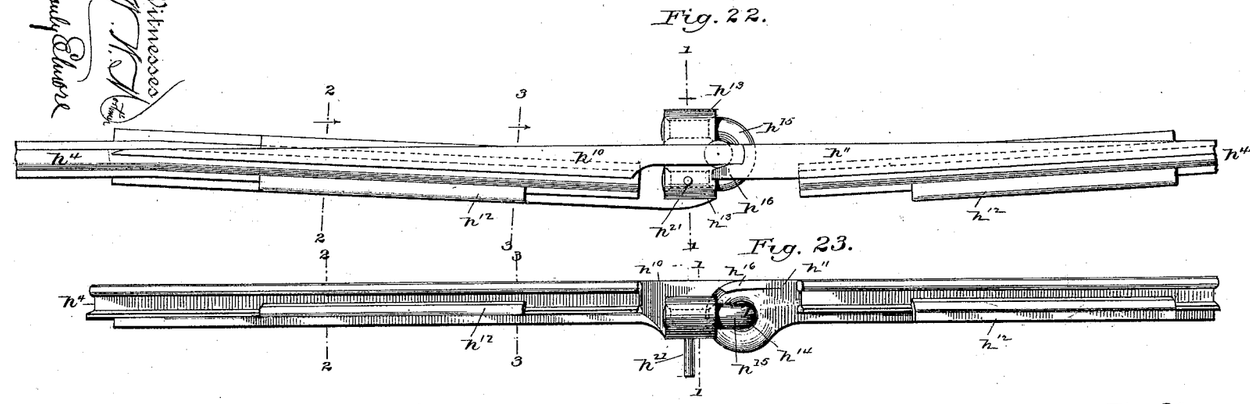
Fig. 22 is a top plan view of one of the rail-joints.
Fig. 23 is a side elevation of the same.
Figure 24:
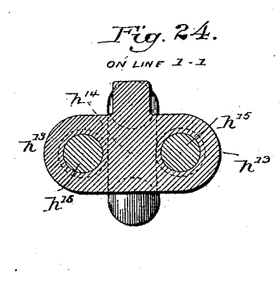
Figs. 24, 25, and 26 are cross-sections of the same on the lines thereon indicated.
Figure 25:
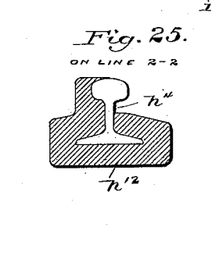
Figure 26:
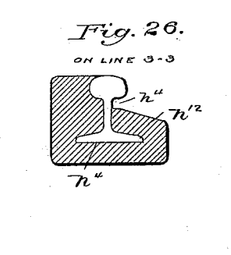
Figure 27:
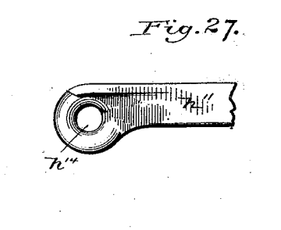
Fig. 27 is a side view of one of the parts.

Referring to Figs. 22 to 27, $h^4$ $h^4$ represent the rails mounted, respectively, on the upper and lower frames H and H'. At their adjacent ends these rails are deflected horizontally outward, as shown in Fig. 22. Two longitudinally-tapered plates $h^{10}$ and $h^{11}$, joined end to end, as hereinafter described, are applied to the inner sides of the rails, so as to bridge over the space between them. The upper surface of these plates forms a continuation of the tops of the rails and presents a smooth unbroken surface over which the wheels may pass from one rail to the other. Each of the tapered plates is formed at the base with a flange $h^{12}$, adapted to embrace the base of the rail, this arrangement holding the plates securely in position against the sides of the rails, but permitting them to slide endwise thereon, as the distance between the rails is varied by the raising and lowering of the frame H'. The joint between the tapered plates is of such character as to allow a universal motion between them. The plate $h^{10}$ is provided with laterally-extending ears $h^{12}$, and the plate $h^{11}$ provided with a circular eye $h^{14}$, such as shown in Fig. 27. A stirrup $h^{15}$, of round iron, is passed through the eye of the plate $h^{11}$ and its ends inserted through and riveted fast into the ears of the plate $h^{10}$. The end of the plate $h^{10}$ is rounded both horizontally and vertically, so as to admit flexion in the joint both laterally and vertically. When the frame H' is lowered at a sharp angle to the upper frame, there will be a slight break or opening between the ends of the plates $h^{10}$ and $h^{11}$. In order to carry the wheels smoothly over this break, I provide the plate $h^{11}$ with a side lip $h^{16}$, which laps past the side of the plate $h^{10}$, and which is so shaped and curved as to carry the wheels over the joint.

In order that the joint may stand at all times midway between the two frames, and to prevent the tapered plates from shifting endwise out of position, I provide plates $h^{17}$, such as shown in Fig. 17. These plates are applied one on each side, and each connected at one end by a pivot $h^{18}$ to the upper frame and by a pivot $h^{19}$ to the lower frame, the last-named pivot extending through a slot in the plate in order to prevent the parts from cramping. This plate $h^{17}$ is provided with vertical slots $h^{20}$, which receive studs $h^{21}$, extending outward from the joints of the tapered rails. This arrangement, while permitting the tapered rails to change their angles to each other, effectually prevents them from shifting endwise.

The excavator-buckets are constructed in the form and manner represented in Figs. 15, 16, 19, 20, and 21. Each bucket consists of a sheet-metal body $f'$, in the form shown, provided with a cast-steel lip $f^2$, extending across the forward edge and along its two sides. This lip is formed as shown and riveted securely to the edge of the bucket. It serves the double purpose of receiving the wear and of stiffening the body portion.

Figures 18, 19, 20, 21:
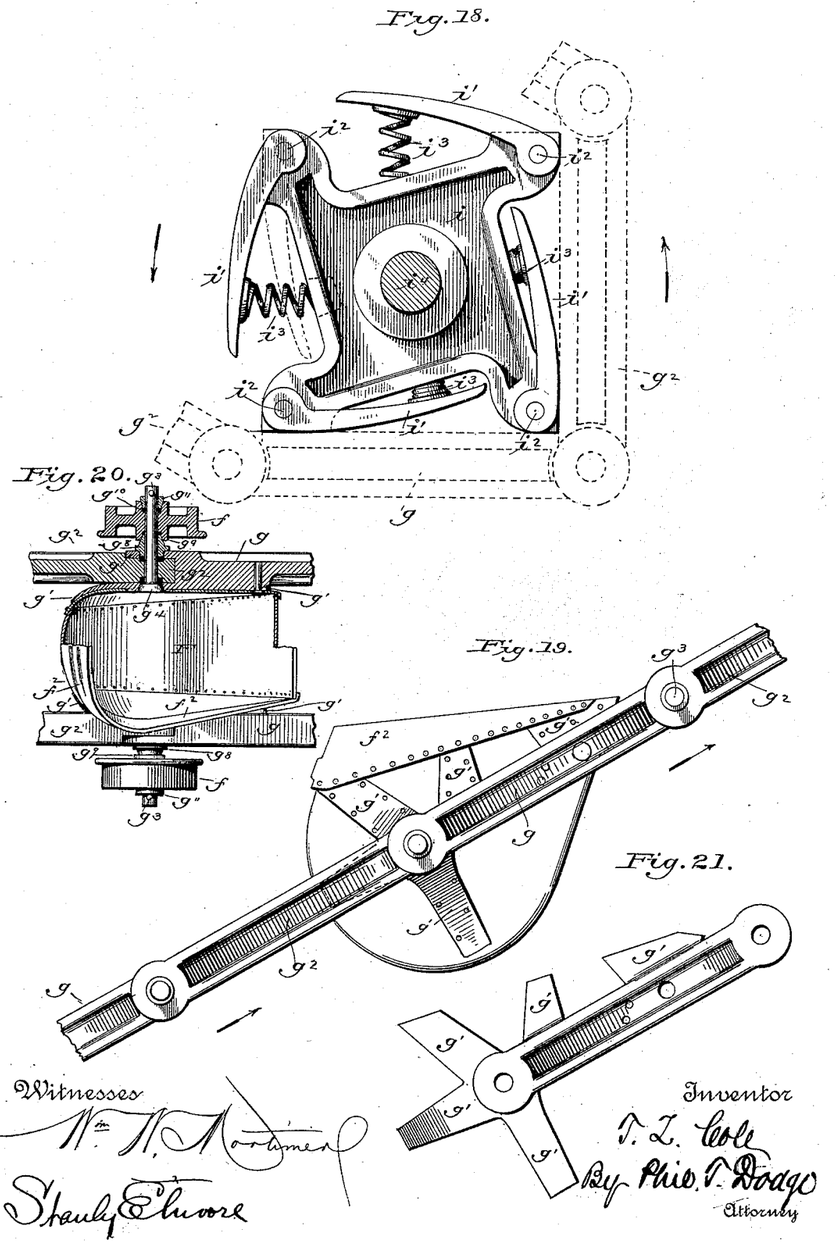
Fig. 18 is a side view of one of the yielding wheels used to move the chains of buckets.
Fig. 19 is a side view of one of the excavator-buckets and the links connected thereto, the wheels being omitted.
Fig. 20 is a top plan view of the bucket with its sustaining links and wheels, the parts on one side being shown in horizontal section through the axis of the wheel.
Fig. 21 is a side view of one of the links.

On each side the bucket is provided with a supporting and driving link $g$, forming a member of the chain to be presently described. This link is cast complete, as shown in Fig. 21, with the arms or flanges $g'$, which are riveted firmly to the side of the bucket, so that the bucket and the links remain in fixed relations to each other. At the lower end the link is vertically divided to form a jaw, which receives the end of a connecting-link $g^2$. An axle or journal $g^3$ is inserted from the inside of the bucket through the ends of the links $g$ and $g^2$ and is extended on the outside to receive the supporting-wheel $f$. It will thus be seen that the journal serves the double purpose of a pivot or connection between the links and of an axle to carry the wheels. At the lower end each link has, as shown in Figs. 16 and 20, on its inner side, around the journal or axle, an annular projection or hub extending through the side wall of the bucket in order to receive and carry the weight, and thus relieve the rivets and increase the strength of the connections. The axle or journal $g^3$, which is prevented by its head from sliding outward and by the collar and pin at its outer end from sliding inward, is fitted so that it may be withdrawn at will to permit disconnection of the links. Owing to the fact that the end of the link $g$ is forked and that the axle or journal is seated in both arms of the forked portion, the axle is firmly sustained, so that it will not be tipped out of position by the action of the connecting-link on the wheels. As the weight of the loaded bucket is very great, it is of the first importance that the journal or axle shall be firmly sustained; hence the advantage of the peculiar construction herein described. The upper or forward end of the link $g$ is inserted within and connected by a horizontal pivot $g^3$ to the end of the next succeeding link $g^2$. The entire chain is composed, it will be observed, of the links $g$, fixed rigidly to the bucket and of the intermediate connecting-links $g^2$.

In the present class of machines great difficulty is experienced in consequence of the rapid wearing and cutting away of the parts by reason of sand and gritty matters entering the joints of the links and the bearings of the wheels. To obviate this difficulty, I propose to introduce packing into the joints in the manner represented in Fig. 16. Each axle is provided at the inner end with a head or enlargement $g^4$. A packing-ring $g^6$, of any appropriate material, is introduced around the axle and in such position as to cross the joint between the inner face of the link $g^2$ and the outer face of the link $g$. Packing is in like manner inserted around the axle at $g^7$ and across the joint between the link $g^2$ and the inner side of link $g$. A collar or washer $g^8$ is applied around the outer end of the axle and outside of the links to hold the packing $g^7$ to its place. The hub of the wheel $f$, and which is located on the outer end of the axle, has an annular recess in each end around the axle, with packings $g^9$ and $g^{10}$ inserted in these recesses, as shown. The inner packing $g^9$ is held in place by the collar $g^8$, fitting into the recess, while the outer packing is held in like manner by a collar $g^{11}$.

By means of the packing applied as described all silicious or gritty matters are excluded from the wearing-surfaces, and at the same time the lubricants are retained therein.

In operating chains of excavator-buckets it is found that there is ordinarily much concussion and wear as the buckets pass successively around the driving-wheels. To avoid this difficulty, I propose to employ driving-wheels which shall act with an elastic or yielding effect upon the chain. These wheels may be variously constructed in forms equivalent to that herein shown; but I recommend for ordinary circumstances the peculiar construction represented in Fig. 18, in which I represents the wheel, composed of an approximately-square body or plate $i$; a series of peripheral arms $i'$, connected to the respective corners of the body by pivots $i^2$, and springs $i^3$, which are applied under the free ends of the arms to force the same outward. A pair of these wheels are secured on a horizontal shaft $i^4$ in the upper end of the frame H, in position to act upon the links upon opposite sides of the buckets. The wheel revolves in the direction indicated by the arrow in Fig. 18. As the successive links approach the wheel they first encounter the outer ends of the pivoted arms, and as the rotation progresses the pressure, overcoming the springs, forces the arms inward until finally the solid corner of the body encounters the chain and imparts a positive motion thereto. The effect of this yielding action is to prevent the concussion and to relieve the parts of the shocks and strains to which they are commonly subjected.

Referring to the drawings, it will be observed that the upper end of my chain of excavator-buckets is located slightly forward of the center of the turn-table, so that the ascending buckets reaching the upper end of the chain discharge their load at a point coincident or substantially coincident with the axis of the turn-table. This is an important feature of the present construction in that it permits the turn-table and chain of buckets to be turned horizontally without changing appreciably the point of discharge.

It will be observed that under my construction the axis of the wheels which carry the upper end of the excavator-chain is located outside of the axis of the turn-table—that is to say, between the axis of the turn-table and the receiving end of the excavator-chain.

In machines of the present class as heretofore constructed the buckets discharge either a considerable distance in front or a considerable distance in rear of the axis of the table. The result was that in turning the table the point of delivery was shifted toward one side or the other of the scow. This necessitated the employment of chutes or conductors to return the soil to a central point and resulted in an uneven loading of the conveyer-buckets and in other difficulties unnecessary to enumerate. Under my construction the soil is delivered from the excavator-buckets immediately and directly to the conveyer-buckets, hereinafter described.

Figure 1:
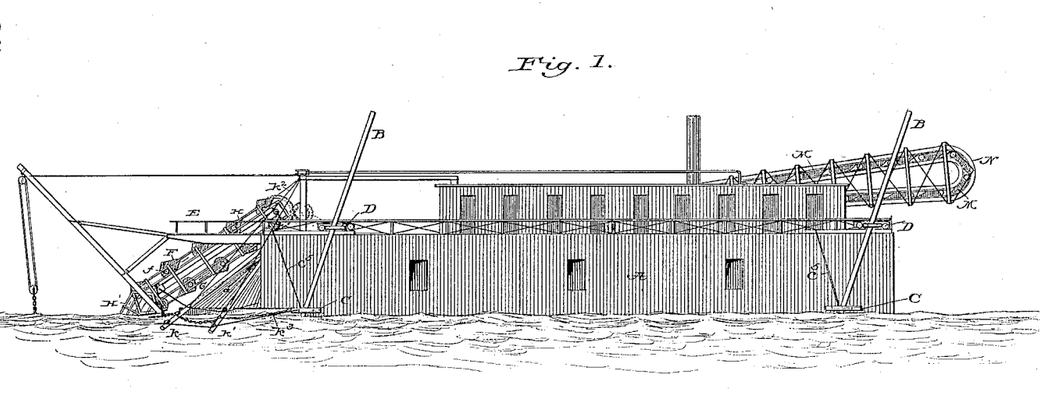
Figure 1 is a side elevation of my complete machine.

The excavator-frame H' is suspended and adjusted at the lower end by means of tackle—such as represented in Fig. 1—or by other suitable means. As these parts are or may be of ordinary construction and form no part of the present invention, a detailed description thereof is unnecessary.

Figure 12:
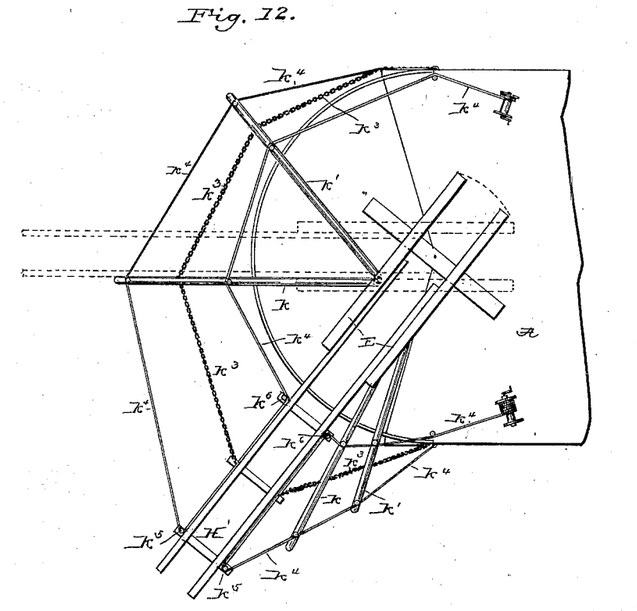
Fig. 12 is a top plan view of the forward end of a scow, showing in outline the turn-table, the chain-supporting frame, and the means for swinging the same laterally.
Figure 13:
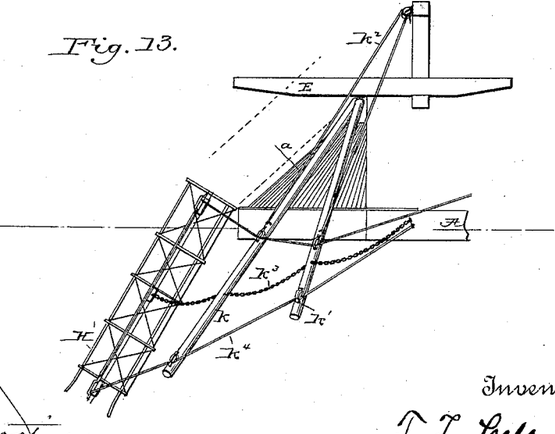
Fig. 13 is a side elevation of parts shown in the preceding figure.

In the operation of machines of the present form it is necessary that the excavator-frame shall be swung continuously to and fro from side to side at a uniform rate of speed. Heretofore much difficulty has been experienced in securing this action. I have therefore devised the peculiar arrangement of parts represented in Figs. 1, 12, and 13, in which $k$ and $k'$ represent spars jointed at their upper ends to opposite sides of the turn-table and extending thence downward and outward, their outer ends being adjustably sustained by lines $k^2$, extending to a gallows-frame on the top of the turn-table. A chain $k^3$ is extended from the side of the scow to the first spar, and thence to the next spar, and thence to the side of the excavator-frame, being attached rigidly to each of said parts. A like chain is applied in the same manner at the opposite side. As the turn-table and excavator-frame swing toward either side of the scow, the chains on that side are slackened and the spars closed together, while the chain on the opposite side is tightened, so as to separate the spars, as clearly shown in Fig. 12. A line $k^4$ is extended from each side of the scow over suitable pulleys or guides on the adjacent spars to a pulley $k^5$ on the excavator-frame, near its outer end, and thence inward around a second pulley $k^6$ on said frame and backward over guides on the spars to the starting-point, where it is connected with a winding-drum or other take-up device. By taking up either line it acts to swing the excavator-frame toward that side of the scow. The spars serve, mainly, as a means of supporting the operating-lines $k^4$. Lines acting on the frame both at its outer end and at its middle draw the same sidewise without liability of bending or springing it laterally.

Figure 11:
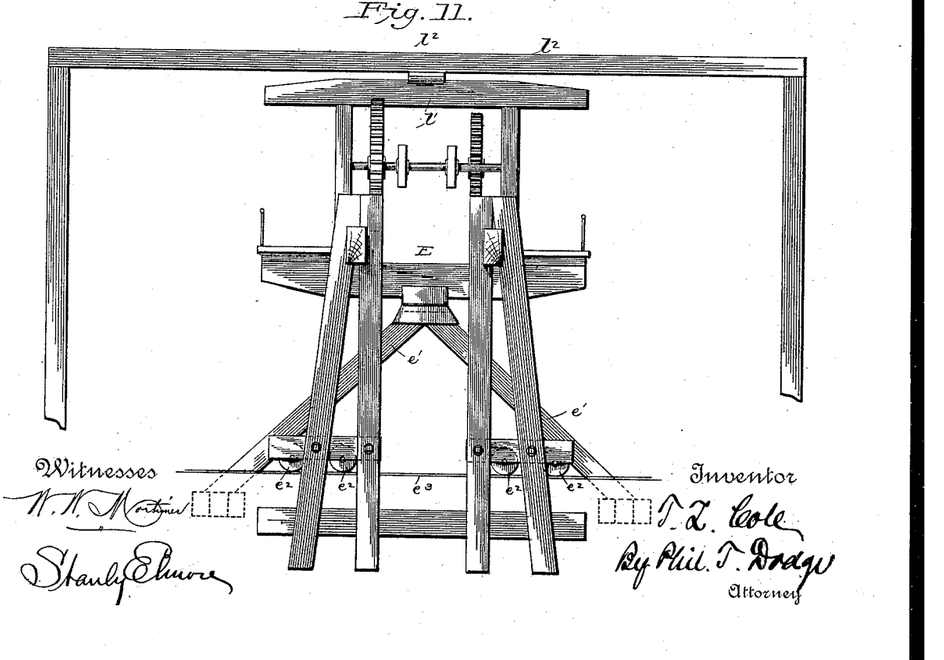
Fig. 11 is a front elevation of parts of the frame shown in the preceding figure.

I commonly drive the excavator-chains through an intermediate train of gearing from main shaft $l$ by an ordinary reciprocating engine L, which is mounted on the inner or rear end of the turn-table, so as to act as a counter-balance for the excavator-frame. I supply steam to an operating-engine through a connection such as shown in Fig. 10. A gallows-frame $l'$ is erected, as shown in Figs. 10 and 11, on top of the turn-table and directly under a similar frame $l^2$, erected on the scow. A steam-pipe $l^3$ is extended from the engine and carried vertically through the two frames in a line coincident with the axis of the turn-table. A steam-supply pipe $l^4$ is connected to the pipe $l^3$ by an intervening section $l^5$. This intervening section $l^5$, having a flange or collar around its upper end, is inserted through the opening in the top of the pipe $l^4$ and screwed rigidly into the upper end of pipe $l^3$. Its flanged end is seated in a bearing in the pipe $l^4$ and is surrounded by a packing $l^6$, held in place by collars or glands $l^7$, secured upon the outside of the pipe. The opening through which the pipe $l^5$ is inserted is closed by a removable plate $l^8$. The above connection admits of the turn-table and the delivery end of the steam-pipe turning freely without permitting the escape of steam at the joint.

Figure 28:
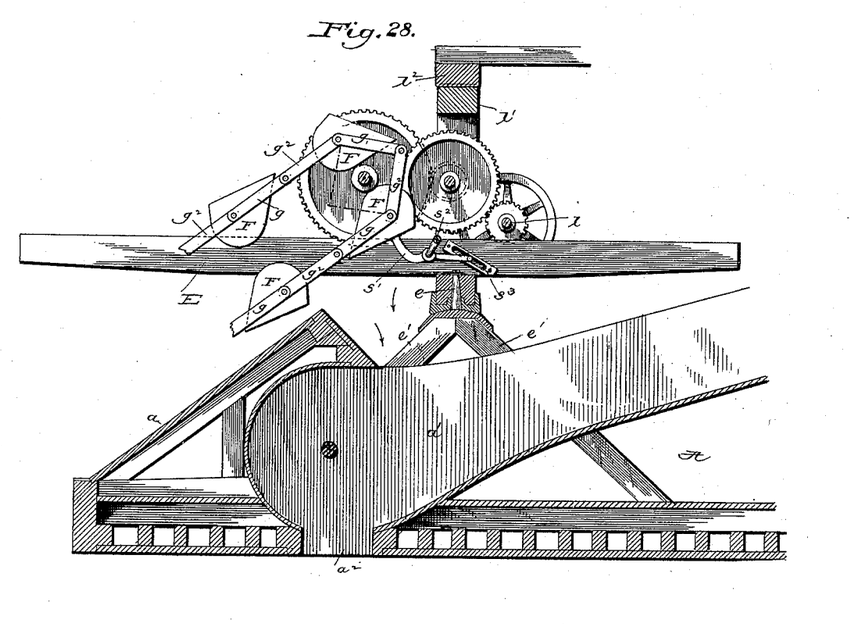
Fig. 28 is a vertical longitudinal section through the forward end of a scow, showing particularly the construction of the devices for clearing the buckets.
Figure 29:
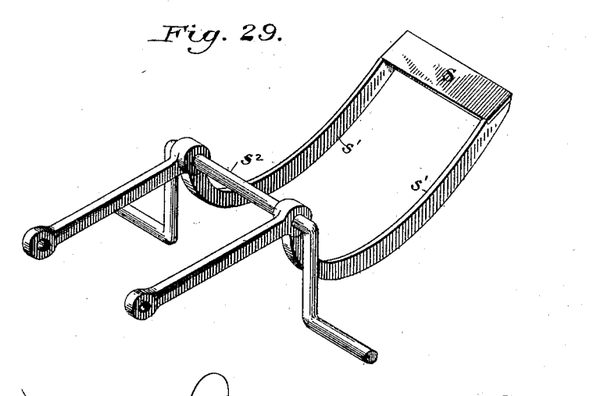
Fig. 29 is a perspective view of the clearer and its driving-crank.

In order to insure the entire delivery of the material from the excavator-buckets, I provide a peculiar scraper or clearing device. (Shown in Figs. 28 and 29.) This consists of a blade S, attached at its ends rigidly to the forward curved ends of two parallel arms $s'$, which latter are mounted midway of their length on a crank-shaft $s^2$ and guided at their rear ends by a cross-rod passing through them and arranged to slide at its extremities in fixed slotted plates $s^3$. The various parts are so proportioned and arranged that while each bucket is descending at the delivery end of the chain the blade S is thrust therein and carried over its inner surface, the relative movement of the parts being such that the blade is withdrawn in time to permit the continued movement of the bucket.

*Conveyer - buckets.*—In the longitudinal channel of the scow I employ an endless chain of conveyer-buckets M. At their lower forward ends they rise in position to receive the soil directly from the excavator-buckets. From this point the chain is continued rearward and upward to a considerable height above the scow—commonly a height twenty-five feet from the surface of the water, or thereabout.

In dredging-machines as ordinarily constructed the excavator-buckets are arranged to raise the soil to substantially the level at which it is to be finally delivered. In practice I find that this subjects the excavator-buckets and their driving mechanism to an excessive strain. I therefore arrange the receiving end of my conveyer at the lowest possible level and carry the excavator-buckets only so high as is necessary to secure the delivery of the soil to the conveyer, which latter is relied upon as the means of further elevating the soil to the point of delivery.

It is to be noted as a peculiarity of my construction that the conveyer is extended longitudinally through the middle of the scow and carried beyond its stern, so that it will deliver directly into scows or transports which may be brought thereunder. The extension of the conveyer centrally of the body is advantageous in that it simplifies the construction and in that it brings substantially the entire weight at the center of the scow, so that the latter may be handled in rough water and transported at sea without danger.

Figure 33:
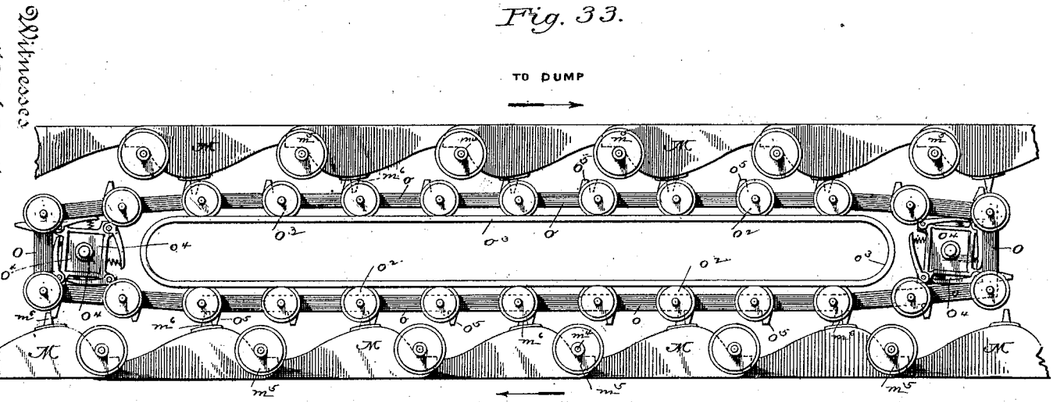
Fig. 33 is a side elevation showing a number of the conveyer-buckets and the chain for imparting motion thereto, the supporting-frames and tracks being omitted.
Figures 34, 35:
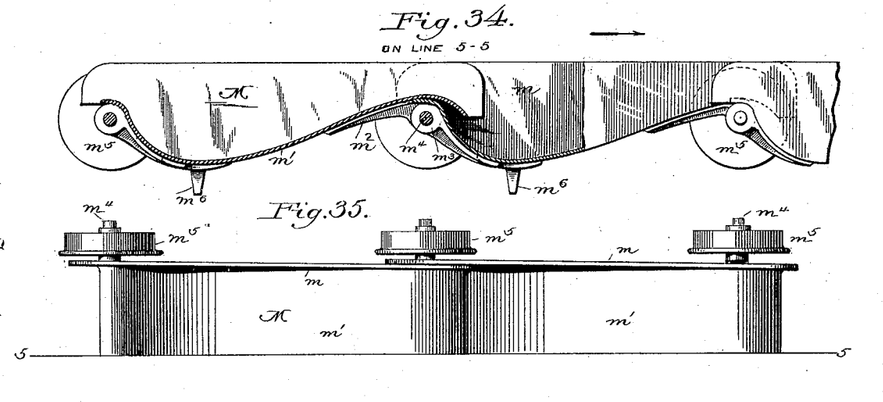
Fig. 34 is a vertical longitudinal section on the line 5 5 of Fig. 35.
Fig. 35 is a top plan view showing one side or half of the conveyer-buckets.

The conveyer-buckets are constructed in the form shown in Figs. 33, 34, and 35, each bucket consisting of two vertical side walls $m$ and a longitudinally-curved bottom $m'$, jointed rigidly thereto. Commencing at the rear end the bottom is curved sharply downward and rises thence with an easy or gradual curve toward the opposite end. The two ends of the bottom stand at substantially the same level, but at a considerable distance below the upper edges of the side walls. The forward end of each bucket is made slightly narrower than the rear end of the next, so that it may be inserted closely therein, as shown in the several figures. The joining buckets, overlapping both at the bottom and the sides, form in effect a continuous moving trough or conductor. Each bucket is provided at one end with two ears $m^2$, and the adjacent bucket provided with an intervening ear $m^3$, the ears being connected by transverse axles $m^4$, the outer ends of which are provided with sustaining-wheels $m^5$. Each bucket is also provided on the under side with a lug or projection $m^6$, for a purpose which will presently appear. The buckets, connected end to end in an unbroken chain, are mounted within a strong supporting-frame N, consisting of longitudinal and transverse timbers united in the peculiar manner shown or in any other equivalent manner. This frame is provided internally on each side with an endless track or rail $n$, and also with an outer endless track $n'$. The wheels of the buckets travel upon and between these two rails in the manner shown in Fig. 30.

Figures 30, 31, 32:
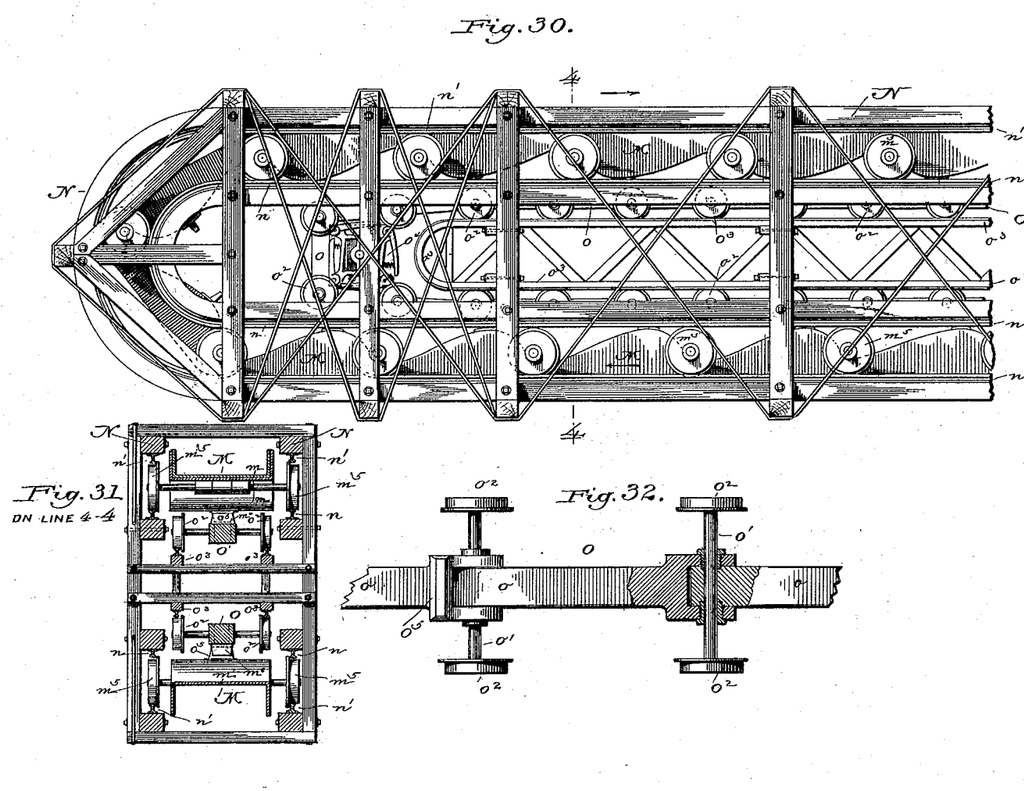
Fig. 30 is a side elevation showing one end of the frame which supports the conveyer-buckets, the latter being shown in position therein.
Fig. 31 is a cross-section on the line 4 4 of the preceding figure.
Fig. 32 is a plan view showing the portion of the endless chain by which the excavator-buckets are moved.

For the purpose of imparting motion to the chain of conveyer-buckets I employ an endless driving-chain O, such as shown in Figs. 30, 32, and 33. This chain consists simply of links $o$, having their ends articulated and connected by transverse axles $o'$, which latter are provided at the ends with sustaining-wheels $o^2$. The wheels of chain O are arranged to travel around an endless rail $o^3$, mounted on the inside of the frame $m$. At its two extremities the chain O passes around and is supported by square wheels $o^4$, one of which is connected with a suitable motor for imparting motion to the chain. It will be observed that the chain O travels inside of the chain of excavator-buckets, and that each of the links $o$ is provided with a projection $o^5$, adapted to engage the projections $m^6$ on the conveyer-buckets for the purpose of moving the latter forward. In practice I find that the employment of the endless driving-chain is advantageous for various reasons, but principally because of the fact that the power is applied to several buckets at a time instead of being concentrated at a single point. The wheels $o^4$, to operate the driving-chain, are preferably constructed with yielding arms in the same manner as the wheels I, for driving the excavator-buckets.

In practice I find that the conveyer-buckets having the peculiar curvature shown—that is to say, with the bottom descending constantly at the rear end and rising gradually toward the delivery end—are superior to those of ordinary form in that they permit a freer and more uniform delivery of the material.

I commonly drive the conveyer-buckets by an independent engine P, belted to the driving-wheel $o^4$; but any other driving arrangement may be employed.

Having thus described my invention, what I claim is—

1. In a dredging-machine, a scow having the longitudinal channel built within the same, as distinguished from a chute mounted upon the deck, said channel having an open top, but closed sides and bottom, and commencing at one end near the bottom of the scow and rising thence toward the opposite end.

2. The scow for a dredging-machine, having therein the longitudinal closed channel commencing near one end of the scow and near its bottom and extending thence upward toward the opposite end, with an opening at its lower end through the bottom of the scow.

3. The scow for a dredging-machine, having the inclined rounded bow and the longitudinal central channel $a'$, extended forward beneath the inclined bow, substantially as shown, whereby the scow is adapted to give a firm support to the turn-table and excavator-buckets and to permit the extension of the conveyer forward beneath the delivery-point of the excavator-buckets.

4. In a dredging-machine, the scow having therein the inclined channel commencing near the bottom, in combination with the inclined conveyer mounted therein and the horizontally-swinging frame provided with a chain of excavator-buckets extending downward beyond and below the end of the scow and terminating at the upper end over the conveyer, whereby the excavation and delivery of the earth are effected and the center of gravity established at a low point in the hull.

5. In a dredging-machine, the scow and the turn-table mounted therein and provided with the chain of excavator-buckets, in combination with the chain of conveyer-buckets commencing beneath the delivery end of the excavator-buckets and extending thence upward centrally through the scow to and beyond its rear end, whereby the soil may be delivered directly to a transport lying at the stern of the machine.

6. In a dredging-machine, the combination of a scow, a turn-table mounted thereon and carrying a chain of excavator-buckets, a stationary inclined frame mounted centrally and longitudinally within the scow and extending beyond its stern, and an endless chain of conveyer-buckets mounted in said frame, its receiving end beneath the delivery-point of the excavator-buckets and its rear end beyond the stern of the scow.

7. In combination with the scow having the central channel therein, the turn-table above the channel, its pivot, and the support for said pivot, consisting of the posts mounted in the scow and converging above the channel, as shown.

8. The scow having the inclined and rounded bow, in combination with the turn-table having the front sustaining-wheels $e^2$ and the rear wheels $e^4$, and the two rails $e^5$ and $e^6$, lying, respectively, above and below the last-named wheels.

9. The scow, the turn-table thereon, and the frame provided with excavator-buckets and mounted on the turn-table, in combination with the laterally-swinging spars, the chains connecting the spars, the scow and the excavator-frame, and the lines $k^4$, extending over guides upon the spars to the excavator-frame, substantially as shown, whereby the spars are enabled to sustain the lines and the latter enabled to control the lateral movement of the frame.

10. The scow and the turn-table mounted on the scow and provided with the excavator frame and buckets, in combination with the spars $k$ and $k'$, jointed to the turn-table, the chains $k^3$, and the frame-controlling lines $k^4$, extended from the scow over guides upon the spars to the excavator-frame and returned thence over the spars to the scow.

11. In an excavator, the combination of a scow, a horizontally-swinging excavator-frame, the lines extending from the scow to the outer portion of the excavator-frame to control its lateral motion, and laterally-swinging outreaching spars to sustain said lines.

12. The excavating-bucket, the link having a vertically-divided end and rigidly secured to the side of the bucket, the second link inserted in the first, the axle or journal connecting said links, and the bucket-supporting wheel mounted on said axle, said parts combined substantially as described and shown.

13. In combination with the bucket, the link rigidly secured thereto and having the vertically-divided end, the second link inserted in said end, the headed removable axle inserted through and connecting the two links, and the wheel mounted on the axle.

14. In combination with the bucket, the link having the divided end or jaw, and the annular hub extended through the side of the bucket, the second link inserted in the jaw of the first, the headed axle inserted through the two links from the inside of the bucket, and the wheel mounted on the upper end of the said axle.

15. In combination with the excavator-bucket and its sustaining-link $g$, having the forked end or jaw, the link $g^2$, inserted in said jaw, the connecting pivot or axle $g^4$, and the packing $g^6$ and $g^7$, encircling the pivot and overlapping the joints between the links, as shown.

16. In combination with the link $g$, having the forked end or jaw, the link $g^2$, inserted therein, the wheel $f$, the collars $g^8$ and $g^{11}$ on opposite sides of the wheel, the axle with the head on one end, and the four packing-rings encircling the axle, as shown, whereby sand and water are excluded from the internal wearing-surfaces.

17. In an excavator, a chain-driving wheel provided, substantially as shown and described, with peripheral spring-supported arms to act upon the chain, whereby concussion is prevented as the successive links are received upon the wheel.

18. The driving-wheel for an excavator-chain, consisting of the angular body or hub, the arms pivoted to the corners of the hub, and the springs seated beneath and acting to sustain the arms.

19. In an excavator, the frame-sections H H', hinged together end to end and provided with tracks to receive the bucket-wheels, in combination with the tapered splice-bars $h^{10}$ $h^{11}$, jointed together and arranged to slide on the rails, and the side plates $h^{17}$, to keep the splice-plates from shifting.

20. In an excavator, and in combination with the rails $h^4$ $h^4$, deflected laterally at their proximate ends, the intermediate connection consisting of the tapered bars $h^{10}$ $h^{11}$, jointed together and provided with flanges clasping the bases of the rails, substantially as shown.

21. In a track for excavator-buckets, the rail joint or splice consisting of the tapered bar $h^{10}$, having the stirrup $h^{15}$ secured to its end, and the tapered bar $h^{11}$, with an eye encircling the stirrup, as shown.

22. In an excavator, and in combination with the jointed excavator-frame, the rails $h^4$ $h^4$, standing end to end, the sliding splice-plate $h^{10}$ on one of said rails, and the sliding splice-plate $h^{11}$ on the second rail, jointed to the plate $h^{10}$ and provided with a curved side lip $h^{16}$, substantially as described, whereby an unbroken flat surface is maintained between the rails $h^4$, notwithstanding the varying angle between them.

23. The frame for a chain of excavator-buckets, consisting, essentially, of the U-shaped transverse metal frames and longitudinal track-sustaining timbers bolted thereto.

24. The transverse U-shaped bars $h$, in combination with the longitudinal track-sustaining timbers $h^1$ $h^2$ and the intermediate cross-timbers $h^3$.

25. The transverse U-shaped bars $h$ and the longitudinal timbers, in combination with the track-sustaining brackets.

26. In combination with a chain of conveyer-buckets M, an independent endless drive-chain adapted and arranged, substantially as described, to engage directly with and communicate motion to the buckets.

27. The endless chain of wheeled conveyer-buckets and rails or tracks to sustain the same, in combination with an internal wheeled driving-chain having lips to engage the buckets and tracks to sustain the driving-chain wheels.

28. The conveyer-buckets jointed together end to end, each bucket having its bottom depressed suddenly or abruptly at the rear end and curved thence gradually upward to the forward or delivery end, as shown.

In testimony whereof I hereunto set my hand, this 22d day of December, 1888, in the presence of two attesting witnesses.

THOMAS Z. COLE.

Witnesses:
 PHIL. T. DODGE,
 W. R. KENNEDY.